(12) United States Patent
Lai et al.

(10) Patent No.: US 8,878,124 B2
(45) Date of Patent: Nov. 4, 2014

(54) OPTICAL TOUCH DEVICE HAVING AN AUXILIARY LIGHT GUIDE COMPONENT DISPOSED BETWEEN THE TWO NEIGHBORING ENDS OF FIRST AND SECOND LIGHT GUIDE COMPONENTS

(75) Inventors: Hung-Ching Lai, Hsinchu (TW); Chun-Sheng Lin, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 267 days.

(21) Appl. No.: 13/443,809

(22) Filed: Apr. 10, 2012

(65) Prior Publication Data

US 2012/0318957 A1 Dec. 20, 2012

(30) Foreign Application Priority Data

Jun. 15, 2011 (TW) .............................. 100120958 A

(51) Int. Cl.
*H01J 40/14* (2006.01)
*G06F 3/042* (2006.01)

(52) U.S. Cl.
CPC .................................... *G06F 3/0428* (2013.01)
USPC ......................................... 250/221; 250/239

(58) Field of Classification Search
USPC ............... 250/221, 239, 216, 227.11, 227.14; 345/154–157, 173–176
See application file for complete search history.

(56) References Cited

U.S. PATENT DOCUMENTS

| 8,436,834 B2 * | 5/2013 | Cheng et al. .................. 345/175 |
| 2010/0253637 A1 | 10/2010 | Lieberman et al. |
| 2011/0102375 A1 | 5/2011 | Liu et al. |

FOREIGN PATENT DOCUMENTS

| TW | 199207 | 2/1993 |
| TW | M401789 U1 | 4/2011 |
| TW | 201115436 A1 | 5/2011 |
| TW | 201118690 A1 | 6/2011 |

* cited by examiner

*Primary Examiner* — Que T Le
(74) *Attorney, Agent, or Firm* — Cheng-Ju Chiang

(57) ABSTRACT

An optical touch device with a detecting area includes light guide components, a light source module, a light detecting component and an auxiliary light guide component. Each light guide component includes a first light emitting surface. The light guide components includes a first light guide component and a second light guide component. The auxiliary light guide component and the light detecting component are disposed between two neighboring ends of the first light guide component and the second light guide component, and the light detecting component includes a light detecting end. The auxiliary light guide component is positioned between the light detecting component and the detecting area and includes a first light incidence surface, a second light incidence surface and a second light emitting surface connected between the first light incidence surface and the second light incidence surface. The optical touch device can effectively avoid the blind zone problem.

10 Claims, 5 Drawing Sheets ced between the light reflecting bar 112a and the light

OPTICAL TOUCH DEVICE HAVING AN AUXILIARY LIGHT GUIDE COMPONENT DISPOSED BETWEEN THE TWO NEIGHBORING ENDS OF FIRST AND SECOND LIGHT GUIDE COMPONENTS

FIELD OF THE INVENTION

The present invention relates to a touch device, and more particularly to an optical touch device.

BACKGROUND OF THE INVENTION

Nowadays, the optical touch device is one of electric devices to achieve a touch function. FIG. 1 is a schematic view of a conventional optical touch device with three image detecting components. Referring to FIG. 1, the conventional optical touch device 100 includes four light reflecting bars 112a, 112b, 112c and 112d orderly arranged along four sides of a rectangle. The optical touch device 100 further includes light emitting components 122a, 122b and 122c configured for emitting light to the four light reflecting bars 112a, 112b, 112c and 112d. The light emitting component 122a is disposed between two neighboring ends of the light reflecting bar 112a and the light reflecting bar 112b, the light emitting component 122b is disposed between two neighboring ends of the light reflecting bar 112b and the light reflecting bar 112c, and the light emitting component 122c is disposed between two neighboring ends of the light reflecting bar 112a and the light reflecting bar 112d. The four light reflecting bars 112a, 112b, 112c and 112d are configured for reflecting the light emitted from the light emitting components 122a, 122b and 122c. The optical touch device 100 further includes image detecting components 132a, 132b and 132c. The image detecting component 132a is disposed between the two neighboring ends of the light reflecting bar 112a and the light reflecting bar 112b, and the light emitting component 122a is positioned on the image detecting component 132a. The image detecting component 132b is disposed between the two neighboring ends of the light reflecting bar 112b and the light reflecting bar 112c, and the light emitting component 122b is positioned on the image detecting component 132b. The image detecting component 132c is disposed between the two neighboring ends of the light reflecting bar 112a and the light reflecting bar 112d, and the light emitting component 122c is positioned on the image detecting component 132c.

However, the conventional optical touch device 100 has a blind zone problem. For example, a field of view (FOV) of the image detecting component 132b covers the light reflecting bar 112a and the light reflecting bar 112d. However, a clearance exists between the light reflecting bar 112a and the light reflecting bar 112d to place the image detecting component 132c. Since the image detecting component 132c cannot reflect light, the image detecting component 132b cannot detect the touch point C in the detecting area 150. Thus, the area 150 is the blind zone. Similarly, the image detecting component 132c also has the blind zone problem.

To solve the above problem, a conventional method is described in detailed by using the image detecting components to detect in turn and using the light emitting components to provide compensating light. For example, when the image detecting component 132b is detecting, the light emitting components 122a, 122b provide illuminating light with normal brightness, and the light emitting component 122c provides the compensating light with low brightness to compensate the brightness. Accordingly, the brightness of the clearance between the light reflecting bar 112a and the light reflecting bar 112d is similar with that of the light reflecting bar 112a and the light reflecting bar 112d. Thus, the blind zone problem may be solved. Similarly, when the image detecting component 132c is detecting, the light emitting component 122b is used for providing the compensating light.

However, it needs a complicate driving circuit to make the light emitting components 122b, 122c provide the illuminating light with normal brightness or the compensating light with low brightness depending on the situation. Therefore, the cost of the optical touch device is increased.

SUMMARY OF THE INVENTION

Therefore, the present invention provides an optical touch device, which can effectively solve the blind zone problem of two opposite light detecting components at diagonal positions, and simplify the structure of the driving circuit to reduce the cost of the optical touch device.

To achieve the above and other advantages, the present invention provides an optical touch device with a detecting area. The optical touch device includes a plurality of light guide components, a light source module, a light detecting component and an auxiliary light guide component. The light guide components are arranged along a plurality of sides of the detecting area. Each light guide component includes a first light emitting surface facing the detecting area. The light guide components includes a first light guide component and a second light guide component arranged at two neighboring sides of the detecting area. The light source module provides light into the light guide components. The light detecting component is disposed between two neighboring ends of the first light guide component and the second light guide component. The light detecting component includes a light detecting end facing the detecting area. The auxiliary light guide component is disposed between the two neighboring ends of the first light guide component and the second light guide component, and is positioned between the light detecting component and the detecting area. The auxiliary light guide component includes a first light incidence surface facing the first light guide component, a second light incidence surface facing the second light guide component, and a second light emitting surface facing the detecting area. The second light emitting surface is connected between the first light incidence surface and the second light incidence surface.

In one embodiment provided by the present invention, the second light emitting surface of the auxiliary light guide component includes a non-haze area corresponding to the light detecting end and a haze area beside the non-haze area.

In one embodiment provided by the present invention, the non-haze area is an opening.

In one embodiment provided by the present invention, the second light emitting surface includes a first flat surface, a second flat surface and a third flat surface. The first flat surface is parallel to the first light emitting surface of the first light guide component, the second flat surface is parallel to the first light emitting surface of the second light guide component, and the third flat surface is connected between the first flat surface and the second flat surface. The light detecting end faces the third flat surface.

In one embodiment provided by the present invention, each of the light guide components is a light guide bar, and includes a first side surface and a second side surface which are connected to the first light emitting surface, the first side surface and the second side surface are opposite to each other, the first side surface is a light incidence surface, and the second side surface is a light emitting surface adjacent to the auxiliary light guide component. The light source module includes a first light emitting component and a second light emitting component, the first light emitting component is configured for providing light to the first side surface of the first light guide component, and the second light emitting component is configured for providing light to the first side surface of the second light guide component.

In one embodiment provided by the present invention, the optical touch device further includes a diffusion plate disposed between the auxiliary light guide component and the light detecting component. The diffusion plate includes a non-diffusion area corresponding to the light detecting end.

In one embodiment provided by the present invention, the light detecting component includes a housing and a detecting unit with the detecting end, the housing defines an opening, and the detecting unit is disposed in the housing. The detecting end is exposed from the opening of the housing, and a surface of the housing exposing the light detecting end has a haze structure.

In one embodiment provided by the present invention, the auxiliary light guide component further includes at least one fixing portion configured for fixing the first light detecting component.

In one embodiment provided by the present invention, the auxiliary light guide component is integrally formed with at least one of the first light guide component and the second light guide component.

In one embodiment provided by the present invention, the auxiliary light guide component defines a cavity, and the first light detecting component is received in the cavity. The light detecting end of the light detecting component faces the second light emitting surface of the auxiliary light guide component.

To achieve the above and other advantages, the present invention provides an optical touch device with a detecting area. The optical touch device includes a plurality of light guide components, a light source module, and a light detecting component. The light guide components are arranged along a plurality of sides of the detecting area. The light guide components includes a first light guide component and a second light guide component arranged at two neighboring sides of the detecting area. Each of the first light guide component and the second light guide component includes a first light emitting surface and a second light emitting surface. The first light emitting surface faces the detecting area, and the second light emitting surface is connected to the first light emitting surface. An included angle between the second light emitting surface and the first light emitting surface is an acute angle. The second light emitting surfaces of the first light guide component and the second light guide component are two neighboring end surfaces of the first light guide component and the second light guide component. The light source module is configured for providing light into the light guide components. The second light emitting surfaces of the first light guide component and the second light guide component are configured for guiding the light to an area between the second light emitting surfaces. The light detecting component is disposed between the second light emitting surfaces of the first light guide component and the second light guide component. The light detecting component includes a light detecting end facing the detecting area.

In one embodiment provided by the present invention, each of the first light guide component and the second light guide component further includes a light incidence surface opposite to the second light emitting surface. The light source module includes a first light emitting component and a second light emitting component. The first light emitting component is configured for providing light to the light incident surface of the first light guide component, the second light emitting component is configured for providing light to the light incidence surface of the second light guide component.

In one embodiment provided by the present invention, each of the second light emitting surfaces has micro structures.

In one embodiment provided by the present invention, the light detecting component includes a housing and a detecting unit with the detecting end. The housing defines an opening, and the detecting unit is disposed in the housing. The detecting end of the detecting unit is exposed from the opening of the housing, and a surface of the housing exposing the light detecting end has a haze structure.

In one embodiment provided by the present invention, the optical touch device further includes a diffusion plate. The diffusion plate is disposed in front of the light detecting end, and the diffusion plate includes a non-diffusion area corresponding to the light detecting end.

In one embodiment of the optical touch device of the present invention, the auxiliary light guide component is disposed between the light detecting component and the detecting area, and is disposed at the two neighboring ends of light guide components. The auxiliary light guide component can guide the light emitted from the light guide components to the area which is between the two neighboring ends of the light guide components and for placing the light detecting component. Thus, the exemplary embodiment of the touch optical device may effectively obviate the blind zone problem of the two opposite light detecting components positioned at diagonal positions, and can simplify the driving circuit of the light source module, thereby reducing cost of the optical touch device. In another embodiment of the optical touch device of the present invention, the two neighboring end surfaces of the first light guide detecting component and the second light guide component are the second light emitting surfaces, and the included angle between the second light emitting surface and the corresponding first light emitting surface of each light guide component is the acute angle. Thus, the first light guide component and the second light guide component can guide the light to the area which is between the second light emitting surfaces of the first light guide component and the second light guide component and for placing the light detecting component. Thus, the exemplary embodiment may effectively obviate the blind zone problem of the two opposite light detecting components positioned at diagonal positions, and can simplify the driving circuit of the light source module, thereby reducing the cost of the optical touch device.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
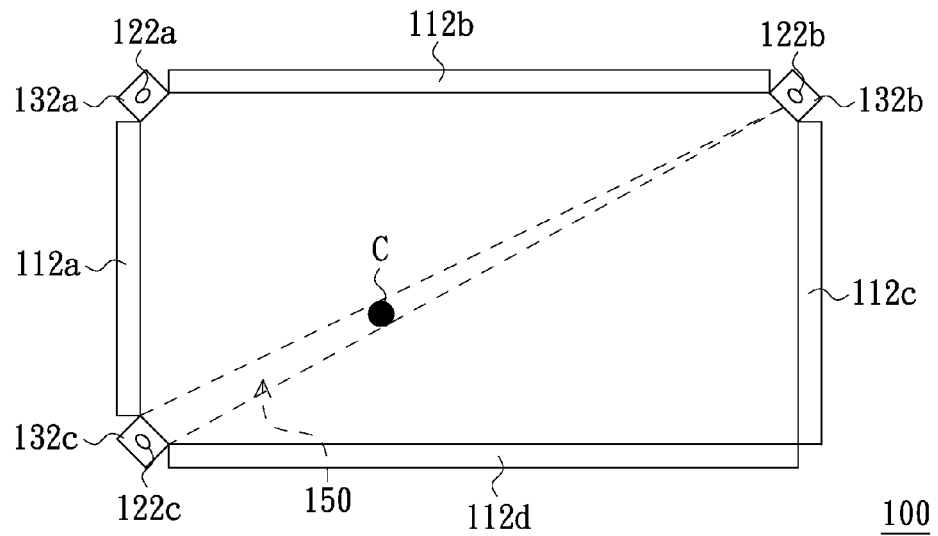
FIG. 1 is a schematic view of a conventional optical touch device with three image detecting components.
Figure 2:
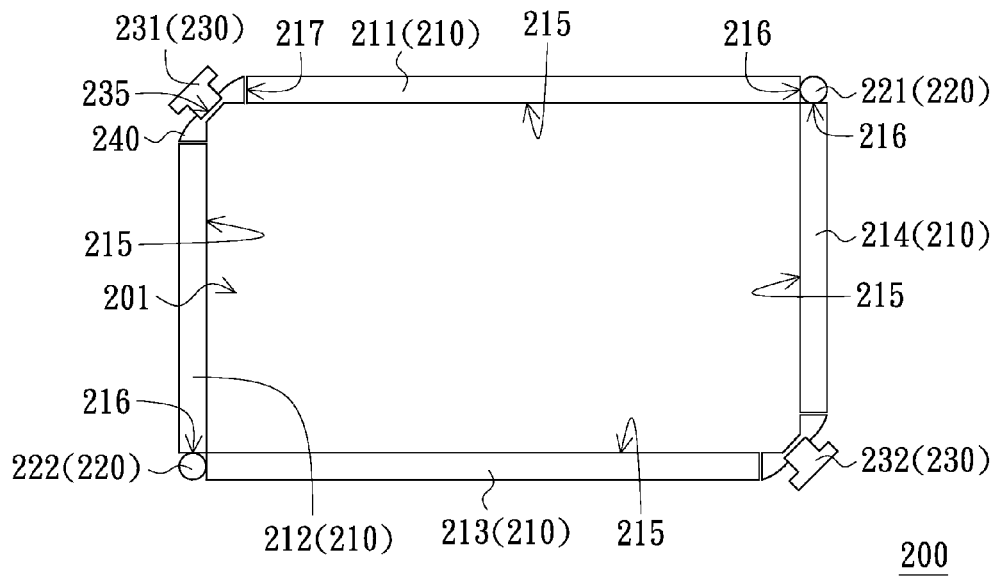
FIG. 2 is a schematic top view of an optical touch device in accordance with an embodiment of the present invention.

FIG. 2 is a schematic top view of an optical touch device in accordance with an embodiment of the present invention. Referring to FIG. 2, an optical touch device 200 with a detecting area 201 includes a number of light guide components 210, a light source module 220, a number of light detecting components 230, and a number of auxiliary light guide components 240. The light guide components 210 are arranged along a number of sides of the detecting area 201, the light source module 220 is configured for providing light into the light guide components 210, the light detecting components 230 are configured for detecting optical information of a touch point in the detecting area 201, and the auxiliary light guide components 240 are configured for guiding the light from the light guide components 210 to the areas for placing the light detecting components 230.

Each light guide component 210 includes a first light emitting surface 215 facing the detecting area 201. In this exemplary embodiment, the detecting area 201 is substantially rectangular. The light guide components 210 may include a first light guide component 211, a second light guide component 212, a third light guide component 213 and a fourth light guide component 214 arranged along four sides of the detecting area 201. The first light guide component 211 and the second light guide component 212 are arranged at two neighboring sides of the detecting area 201, and the third light guide component 213 and the fourth light guide component 214 are arranged at another two neighboring sides of the detecting area 201. The third light guide component 213 faces to the first light guide component 211. The fourth light guide component 214 faces to the second light guide component 212. Each of the light guide components 210 is, for example, a light guide bar. That is, the first light guide component 211, the second light guide component 212, the third light guide component 213 and the fourth light guide component 214 may be light guide bars. Each of the light guide components 210 further includes a first side surface 216 and a second side surface 217 which are connected with the first light emitting surface 215 and opposite to each other. The first side surface 216 serves as a light incidence surface, and the second side surface 217 serves as a light emitting surface.

In this exemplary embodiment, the light source module 220 includes a first light emitting component 221 and a second light emitting component 222. The first light emitting component 221 and the second light emitting component 222 can be light emitting diodes, laser diodes, or the like. The first light emitting component 221 is, for example, disposed between two neighboring ends of the first light guide component 211 and the fourth light guide component 214 for providing light to the first side surfaces 216 of the first light guide component 211 and the fourth light guide component 214. The light from the first light emitting component 221 is incident into the first light guide component 211 and the fourth light guide component 214 through the first side surfaces 216 thereof. The second light emitting component 222 is disposed between two neighboring ends of the second light guide component 212 and the third light guide component 213 for providing light to the first side surfaces 216 of the second light guide component 212 and the third light guide component 213. The light from the second light emitting component 222 is incident into the second light guide component 212 and the third light guide component 213 through the first side surfaces 216 thereof. It is noted that the number of the light source module 220 is not limited to two. The light source module 220 may include more light emitting components according to design requirement.

In this exemplary embodiment, the light detecting components 230 can be, charge coupled devices, complementary metal oxide semiconductor (CMOS) image sensors, or the like. The light detecting components 230 include a first light detecting component 231 and a second light detecting component 232. The first light detecting component 231 is disposed between the two neighboring ends of the first light guide component 211 and the second light guide component 212. The second light detecting component 232 is disposed between the two neighboring ends of the fourth light guide component 214 and the third light guide component 213. Each of the light detecting components 230 includes a light detecting end 235 facing the detecting area 201. That is, the first light detecting component 231 and the second light detecting component 232 respectively include the light detecting end 235.

Figure 3:
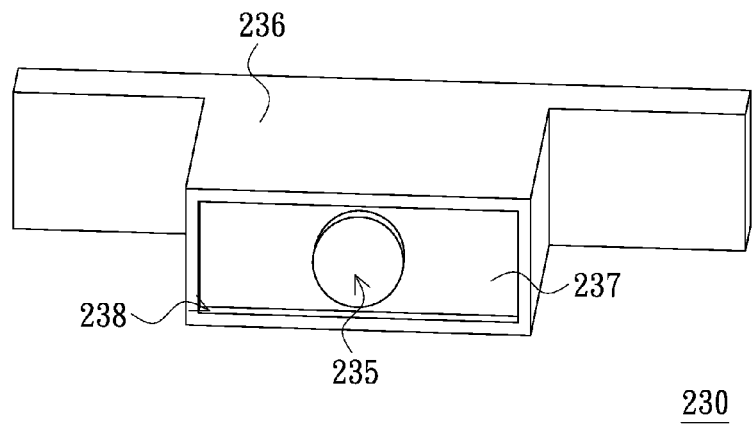
FIG. 3 is a schematic three-dimensional view of a light detecting component in accordance with an embodiment of the present invention.

FIG. 3 is a schematic three-dimensional view of a light detecting component in accordance with an embodiment of the present invention. Referring to FIG. 3, each light detecting component 230 includes a housing 236 and a detecting unit 237 with the light detecting end 235. The housing 236 defines an opening 238, and the optical detecting unit 237 is disposed in the housing 236. The light detecting end 235 of the detecting unit 237 is exposed from the opening 238 of the housing 236. Each auxiliary light guide component 240 is disposed between the corresponding light detecting component 230 and the detecting area 201. In the exemplary embodiment, the optical touch device 200 includes two auxiliary light guide components 240 respectively disposed between the first light detecting component 231 and the detecting area 201, and between the second light detecting component 232 and the detecting area 201. In order to facilitate the description, the auxiliary light guide component 240 disposed between the first light detecting component 231 and the detecting area 201 is taken as an example to describe the structure of the auxiliary light guide component 240.

Figure 4:
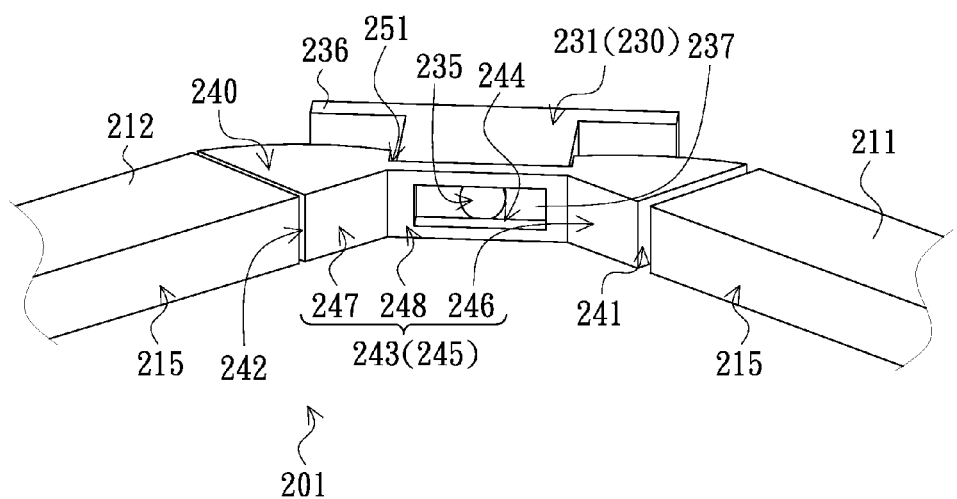
FIG. 4 is a partially schematic three-dimensional view of an optical touch device in accordance with one embodiment of the present invention.

FIG. 4 is a partially schematic three-dimensional view of an optical touch device in accordance with one embodiment of the present invention. Referring to FIGS. 2 and 4, the auxiliary light guide component 240 is disposed at the two neighboring ends between the first light guide component 211 and the second light guide component 212, and is positioned between the first light detecting component 231 and the detecting area 201

The auxiliary light guide component 240 includes a first light incidence surface 241 facing the first light guide component 211, a second light incidence surface 242 facing the second light guide component 212, and a second light emitting surface 243 facing the detecting area 201. The second light emitting surface 243 is connected between the first light incidence surface 241 and the second light incidence surface 242. In this exemplary embodiment, the second light emitting surface 243 includes, for example, a first flat surface 246 parallel to the first light emitting surface 215 of the first light guide component 211, a second flat surface 247 parallel to the first light emitting surface 215 of the second light guide component 212, and a third flat surface 248 connected between the first flat surface 246 and the second flat surface 247.

In this exemplary embodiment, the light emitting from the second side surfaces 217 of the first light guide component 211 and the second light guide component 212 is incident into the auxiliary light guide component 240 respectively through the first light incidence surface 241 and the second light incidence surface 242 thereof, and then emits from the second light emitting surface 243 of the auxiliary light guide component 240. Thus, the auxiliary light guide component 240 can guide the light to the clearance which is for placing the first light detecting component 237 and between the first light guide component 211 and the second light guide component 212, so as to obviate the blind zone problem when the second light detecting component 232 detects. Similarly, since there is the auxiliary light guide component 240 disposed between the second light guide component 213 and the fourth light guide component 214, the blind zone problem may be obviated when the first light guide component 231 detects. In other words, the exemplary embodiment may effectively obviate the blind zone of the opposite first light detecting component 231 and second light detecting component 232 positioned at diagonal positions. In addition, the light emitting brightness of the light source module 220 does not need to be adjusted, so the driving circuit of the light source module 220 can be simplified and the cost of the optical touch device 200 is reduced.

It is noted that, to further uniform the light emitting brightness of the second light emitting surface 243, the second light emitting surface 243 of the auxiliary light guide component 240 includes, for example, a non-haze area 244 corresponding to the light detecting end 235 and a haze area 245 beside the non-haze area 244. In this exemplary embodiment, the non-haze area 244 is, for example, an opening defined in the third flat surface 248. In another embodiment, the non-haze area may be a non-haze light-previous surface. In addition, the first flat surface 246, the second flat surface 247 and a portion of the third flat surface 248 have a haze structure (e.g. diffusion particles) to form the haze area 245. The light detecting end 235 of the first light detecting component 231 faces the third flat surface 248 of the second light emitting surface 243, and is opposite to the non-haze area 244. In addition, another light detecting component may be disposed between the third light guide component 213 and the second light guide component 212. Another light detecting component may be disposed between the fourth light guide component 214 and the first light guide component 211.

The auxiliary light guide component 240 may be integrally formed with one of the first light guide component 211 and the second light guide component 212, or integrally formed with the first light guide component 211 and the second light guide component 212 together. In addition, in the embodiment that the non-haze area 244 is the light-previous surface, the surface of the housing 236 of FIG. 3 having the opening 238 which exposes the light detecting end 235 may have a haze structure. Furthermore, the auxiliary light guide component 240 may have a fixing portion configured for fixing the first light detecting component 231. In FIG. 4, the fixing portion is, for example, a groove 251, and the first light detecting component 231 is latched in the groove 251.

Other different fixing portions will be described in the following embodiments accompanied with figures, but the fixing portions are not limited to the illustrated structures.

Figure 5:
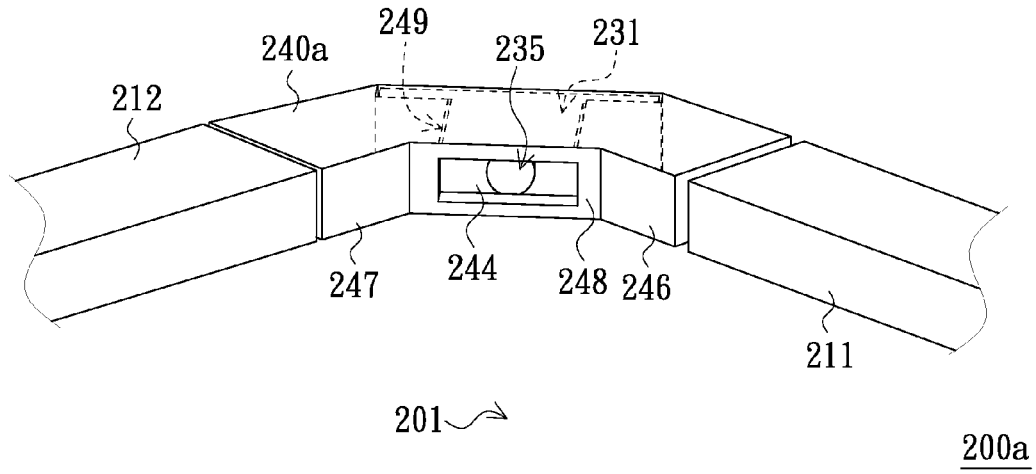
FIG. 5 is a partially schematic three-dimensional view of an optical touch device in accordance with another embodiment of the present invention.

FIG. 5 is a partially schematic three-dimensional view of an optical touch device in accordance with another embodiment of the present invention. Referring to FIG. 5, an optical touch device 200a is mainly similar to the optical touch device 200, and the difference is that an auxiliary light guide component 240a of the optical touch device 200a defines a cavity 249 as the fixing portion, and the first light detecting component 231 is disposed in the cavity 249. The light detecting end 235 of the first light detecting component 231 faces to the non-haze area 244 of the auxiliary light guide component 240a.

Figure 6:
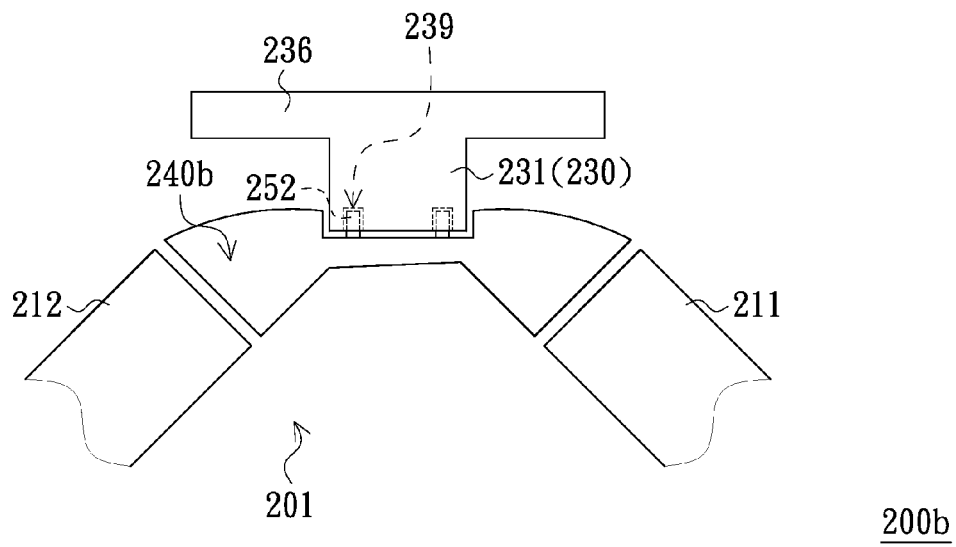
FIG. 6 is a partially schematic top view of an optical touch device in accordance with another embodiment of the present invention.

FIG. 6 is a partially schematic view of an optical touch device in accordance with another embodiment of the present invention. Referring to FIG. 6, an optical touch device of the present embodiment is mainly similar to the optical touch device 200, and the difference is the fixing portion. An auxiliary light guide component 240b of the optical touch device 200b includes a fixing portion 252 configured for fixing the first light detecting component 231. The fixing portion 252 is disposed on a surface of the auxiliary light guide component 240b facing the first light detecting component 231. The first light detecting component 231 includes a positioning structure 239 matching with the fixing portion 252. The first light detecting component 231 and the auxiliary light guide component 240b are fixed together by the combination of the positioning structure 239 and the fixing portion 252. In this exemplary embodiment, the fixing portion 252 includes posts, and the positioning structure 239 includes holes defined in the housing 236 of the first light detecting component 231 for combining with the posts. As such, the fixing portion 252 is embedded in the positioning structure 239 to fix the first light detecting component 231 to the auxiliary light guide component 240b.

Figure 7:
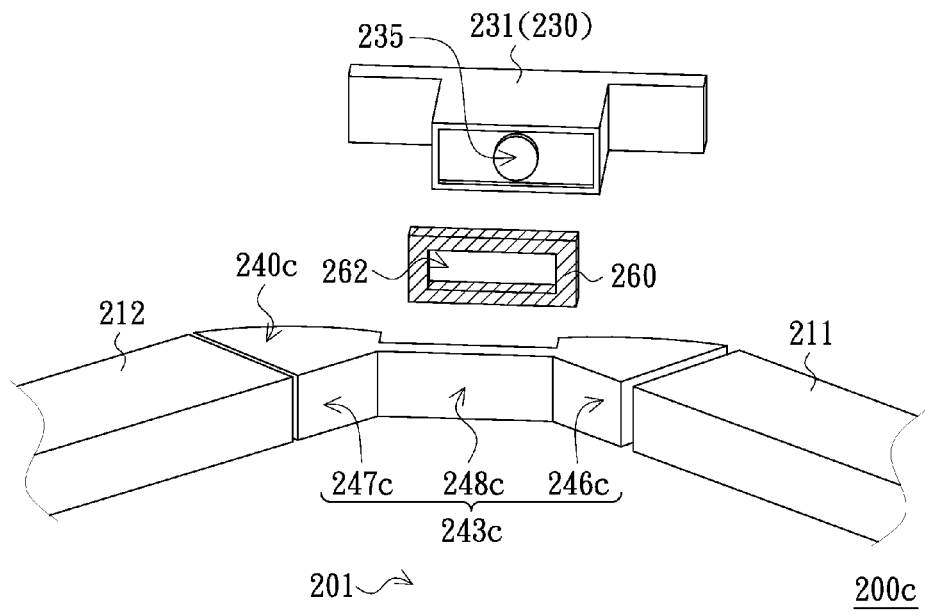
FIG. 7 is a partially schematic exploded view of an optical touch device in accordance with another embodiment of the present invention.

FIG. 7 is a partially schematic exploded view of an optical touch device in accordance with another embodiment of the present invention. Referring to FIG. 7, an optical touch device 200c is mainly similar to the optical touch device 200, and the difference is that the optical touch device 200c further includes a diffusion plate 260. The diffusion plate 260 is disposed between the auxiliary light guide component 240c and the first light detecting component 231. The diffusion plate 260 includes a non-diffusion area 262 corresponding to the light detecting end 235 of the first light detecting component 231. The non-diffusion area 262 is, for example, an opening. The haze structure is not disposed on the first flat surface 246c, the second flat surface 247c and the third flat surface 248c of the second light emitting surface 243c of the auxiliary light guide component 240c. Understandably, the auxiliary light guide component 240c may be replaced by the auxiliary light guide component 240 in the above embodiment. However, the non-diffusion area 262 should correspond to the non-haze area 244 of the second light emitting surface 243 of the auxiliary light guide component 240.

Figure 8:
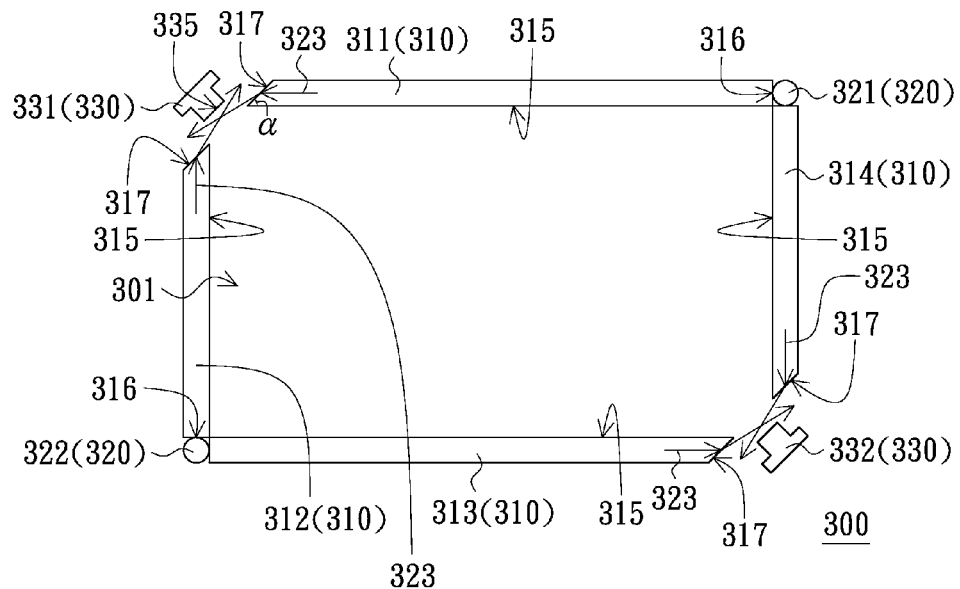
FIG. 8 is a schematic top view of an optical touch device in accordance with another embodiment of the present invention.

FIG. 8 is a schematic top view of an optical touch device in accordance with another embodiment of the present invention. Referring to FIG. 8, an optical touch device 300 with a light detecting area 301 includes a number of light guide components 310, a light source module 320 and a number of light detecting components 330. The light guide components 310 are arranged along a number of sides of the detecting area 301, the light source module 320 is configured for providing light into the light guide components 310, and each of the light detecting components 330 is configured for detecting the optical information of a touch point in the detecting area 301.

Each light guide component 310 includes a first light emitting surface 315 facing the detecting area 301, and a second light emitting surface 317 connected to the first light emitting surface 315. In this exemplary embodiment, the detecting area 301 is substantially rectangular. The light guide components 310 includes, for example, a first light guide component 311, a second light guide component 312, a third light guide component 313 and a fourth light guide component 314 arranged along four sides of the detecting area 301. The first light guide component 311 and the second light guide component 312 are arranged at two neighboring sides of the detecting area 301, and the third light guide component 313 and the fourth light guide component 314 are arranged at another two neighboring sides of the detecting area 301. The third light guide component 313 faces the first light guide component 311. The fourth light guide component 314 faces the second light guide component 312.

In this exemplary embodiment, each of the light guide components 310 is, for example, a light guide bar. That is, the first light guide component 311, the second light guide component 312, the third light guide component 313 and the fourth light guide component 314 are light guide bars. The second light emitting surfaces 317 of the first light guide component 311 and the second light guide component 312 are two neighboring end surfaces of the first light guide component 311 and the second light guide component 312. The second light emitting surfaces 317 of the third light guide component 313 and the fourth light guide component 314 are two neighboring end surfaces of the third light guide component 313 and the fourth light guide component 314. The included angle α of the second light emitting surface 317 and the first light emitting surface 315 of each light guide component 310 is an acute angle. In addition, each light guide component 310 further includes a light incidence surface 316 opposite to the second light emitting surface 317. Each light guide component 310 is configured for guiding the light to the detecting area 301.

The light source module 320 includes, for example, a first light emitting component 321 and a second light emitting component 322. The first light emitting component 321 and the second light emitting component 322 can be light emitting diodes, laser diodes, or the like. The first light emitting component 321 is, for example, disposed between two neighboring ends of the first light guide component 311 and the fourth light guide component 314 and configured for providing the light to the light incidence surfaces 316 of the first light guide component 311 and the fourth light guide component 314. The light emitting from the first light emitting component 321 is incident into the first light guide component 311 and the fourth light guide component 314 through the light incidence surfaces 316 thereof. The second light emitting component 322 is disposed between two neighboring ends of the second light guide component 312 and the third light guide component 313, and configured for providing the light to the light incidence surfaces 316 of the second light guide component 312 and the third light guide component 313. The light emitting from the second light emitting component 322 is incident into the second light guide component 312 and the third light guide component 313 through the light incidence surfaces 316 thereof.

The light detecting component 330 can be, charge coupled devices, CMOS image sensors, or the like. The light detecting components 330 include a first light detecting component 331 and a second light detecting component 332. The first light detecting component 331 is disposed between two second light emitting surfaces 317 of the first light guide component 311 and the second light guide component 312. The second light detecting component 332 is disposed between two second light emitting surfaces 317 of the third light guide component 313 and the fourth light guide component 314. Each light detecting component 330 includes a light detecting end 335 facing the detecting area 301. The structure of the light detecting components 330 are similar to the light detecting components 230 in FIGS. 3 and 4, and is not detailed herein.

In this exemplary embodiment, since the included angle α of the second light emitting surface 317 and the first light emitting surface 315 of each light guide component 310 is the acute angle, the light 323 emitting from the second light emitting surfaces 317 of the first light guide component 311 and the second light guide component 312 can be refracted to the area which is for placing the first light detecting component 331 and between the second light emitting surfaces 317 of the first light guide component 311 and the second light guide component 312, so as to obviate the blind zone problem when the second light detecting component 332 detects. Similarly, the light 323 emitting from the second light emitting surfaces 317 of the third light guide component 313 and the fourth light guide component 314 can be refracted to the area which is for placing the second light detecting component 332 and between the second light emitting surfaces 317 of the third light guide component 313 and the fourth light guide component 314, so the blind zone problem may be obviated when the first light guide component 331 detects. In other words, the exemplary embodiment may effectively obviate the blind zone problem of the opposite first light detecting component 331 and second light detecting component 332 positioned at diagonal positions. In addition, the light emitting brightness of the light source module 320 does not need to be adjusted, so the driving circuit of the light source module 320 can be simplified and the cost of the optical touch device 300 is reduced.

Figure 9:
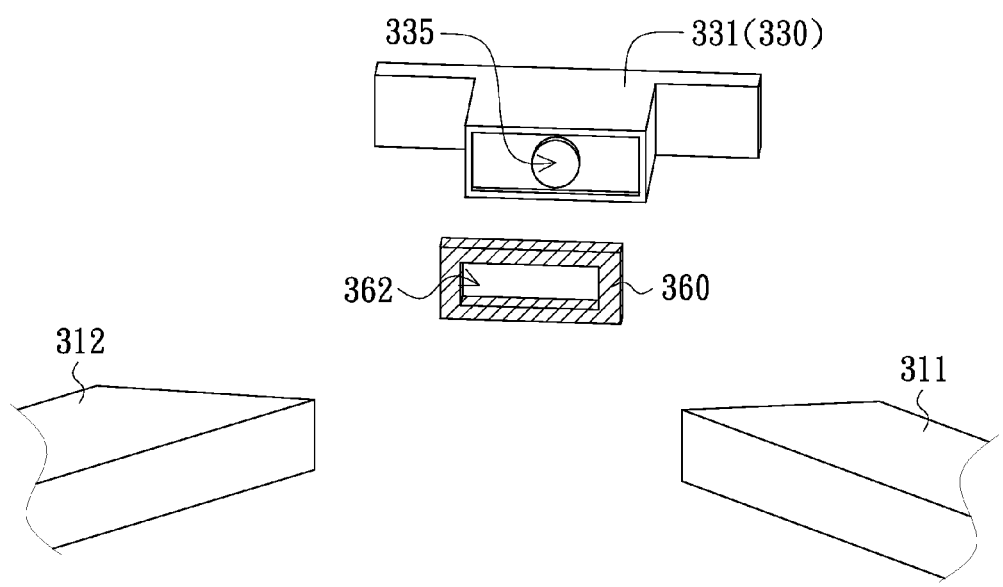
FIG. 9 is a partially schematic exploded view of an optical touch device in accordance with another embodiment of the present invention.

It is noted that, the second light emitting surface 317 may have a plurality of micro structures (not shown) to diffuse the light 323. FIG. 9 is a partially schematic exploded view of an optical touch device in accordance with another embodiment of the present invention. Referring to FIG. 9, an optical touch device 300a is mainly similar to the touch device 300, and the difference is that the optical touch device 300a further includes at least a diffusion plate 360 The diffusion plate 360 is disposed in front of the light detecting end 335 of the corresponding light detecting component 330. The diffusion plate 360 is disposed in front of the light detecting end 335 of the first light detecting component 331, and includes a non-diffusion area 362 corresponding to the light detecting end 335. The non-diffusion area 362 is, for example, an opening.

In summary, in one embodiment of the optical touch device of the present invention, the auxiliary light guide component is disposed between the light detecting component and the detecting area, and is disposed at two neighboring ends of light guide components. The auxiliary light guide component can guide the light emitted from the light guide components to the area which is between the two neighboring ends of the light guide components and for placing the light detecting component. Thus, the exemplary embodiment of the touch optical device may effectively obviate the blind zone problem of the two opposite light detecting components positioned at diagonal positions, and can simplify the driving circuit of the light source module, thereby reducing the cost of the optical touch device. In addition, in another embodiment of the optical touch device of the present invention, two neighboring end surfaces of the first light guide detecting component and the second light guide component are the second light emitting surfaces, and the included angle between the second light emitting surface and the corresponding first light emitting surface of each light guide component is the acute angle. Thus, the first light guide component and the second light guide component can guide the light to the area which is between the second light emitting surfaces of the first light guide component and the second light guide component and for placing the light detecting component. Thus, the exemplary embodiment may effectively obviate the blind zone problem of the two opposite light detecting components positioned at diagonal positions, and can simplify the driving circuit of the light source module, thereby reducing the cost of the optical touch device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical touch device with a detecting area, comprising:
    a plurality of light guide components arranged along a plurality of sides of the detecting area, each of the light guide components including a first light emitting surface facing the detecting area, and the light guide components including a first light guide component and a second light guide component arranged at two neighboring sides of the detecting area;
    a light source module configured for providing light into the light guide components;
    a light detecting component disposed between two neighboring ends of the first light guide component and the second light guide component, and the light detecting component including a light detecting end facing the detecting area; and
    an auxiliary light guide component disposed between the two neighboring ends of the first light guide component and the second light guide component, and positioned between the light detecting component and the detecting area, the auxiliary light guide component including a first light incidence surface facing the first light guide component, a second light incidence surface facing the second light guide component and a second light emitting surface facing the detecting area, and the second light emitting surface being connected between the first light incidence surface and the second light incidence surface.

2. The optical touch device according to claim 1, wherein the second light emitting surface of the auxiliary light guide component includes a non-haze area corresponding to the light detecting end and a haze area beside the non-haze area.

3. The optical touch device according to claim 2, wherein the non-haze area is an opening.

4. The optical touch device according to claim 1, wherein the second light emitting surface includes a first flat surface, a second flat surface and a third flat surface, the first flat surface is parallel to the first light emitting surface of the first light guide component, the second flat surface is parallel to the first light emitting surface of the second light guide component, the third flat surface is connected between the first flat surface and the second flat surface, and the light detecting end faces the third flat surface.

5. The optical touch device according to claim 1, wherein each of the light guide components is a light guide bar, and includes a first side surface and a second side surface which are connected to the first light emitting surface, the first side surface and the second side surface are opposite to each other, the first side surface is a light incidence surface, and the second side surface is a light emitting surface adjacent to the auxiliary light guide component, the light source module includes a first light emitting component and a second light emitting component, the first light emitting component is configured for providing light to the first side surface of the first light guide component, and the second light emitting component is configured for providing light to the first side surface of the second light guide component.

6. The optical touch device according to claim 1, further comprising a diffusion plate, wherein the diffusion plate is disposed between the auxiliary light guide component and the light detecting component, and the diffusion plate includes a non-diffusion area corresponding to the light detecting end.

7. The optical touch device according to claim 1, wherein the light detecting component includes a housing and a detecting unit with the detecting end, the housing defines an opening, and the detecting unit is disposed in the housing, the detecting end of the detecting unit is exposed from the opening of the housing, and a surface of the housing exposing the light detecting end has a haze structure.

8. The optical touch device according to claim 1, wherein the auxiliary light guide component further includes at least one fixing portion configured for fixing the light detecting component.

9. The optical touch device according to claim 1, wherein the auxiliary light guide component is integrally formed with at least one of the first light guide component and the second light guide component.

10. The optical touch device according to claim 1, wherein the auxiliary light guide component defines a cavity, the light detecting component is disposed in the cavity, and the light detecting end of the light detecting component faces the second light emitting surface of the auxiliary light guide component.

* * * * *